(12) United States Patent
Wambugu Ngahu

(10) Patent No.: US 10,951,067 B2
(45) Date of Patent: Mar. 16, 2021

(54) POWER TRANSMISSION UNIT

(71) Applicant: Yazaki Corporation, Tokyo (JP)

(72) Inventor: Antony Wambugu Ngahu, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 31 days.

(21) Appl. No.: 16/515,773

(22) Filed: Jul. 18, 2019

(65) Prior Publication Data

US 2020/0052528 A1 Feb. 13, 2020

(30) Foreign Application Priority Data

Aug. 9, 2018 (JP) .............................. JP2018-150242

(51) Int. Cl.
| | | |
|---|---|---|
| *H02J 50/12* | (2016.01) | |
| *H01F 5/00* | (2006.01) | |
| *H01F 38/14* | (2006.01) | |
| *H04B 5/00* | (2006.01) | |

(52) U.S. Cl.
CPC .............. *H02J 50/12* (2016.02); *H01F 5/003* (2013.01); *H01F 38/14* (2013.01); *H04B 5/0037* (2013.01); *H04B 5/0081* (2013.01)

(58) Field of Classification Search
CPC .... H01F 5/003; H01F 38/14; H01F 2038/143; H01F 2038/146; H04B 5/0037; H04B 5/0081; H02J 50/12
See application file for complete search history.

(56) References Cited

U.S. PATENT DOCUMENTS

| | | | |
|---|---|---|---|
| 8,362,868 B2 | 1/2013 | Tamura et al. | |
| 2011/0050380 A1* | 3/2011 | Nakanishi | ............. H01F 27/341 |
| | | | 336/200 |
| 2011/0102125 A1* | 5/2011 | Tamura | ............... H01F 27/2871 |
| | | | 336/232 |

FOREIGN PATENT DOCUMENTS

| | | |
|---|---|---|
| JP | 8-19985 A | 1/1996 |
| JP | 2003-43229 A | 2/2003 |
| JP | 2009-545876 A | 12/2009 |
| JP | 2010-16235 A | 1/2010 |
| JP | 2016-92214 A | 5/2016 |
| WO | 98/43258 A2 | 10/1998 |
| WO | 2012/039045 A1 | 3/2012 |
| WO | 2018/222669 A1 | 12/2018 |

* cited by examiner

*Primary Examiner* — Patrick C Chen
(74) *Attorney, Agent, or Firm* — Kenealy Vaidya LLP

(57) ABSTRACT

In the power transmission unit, a first coil pattern includes first inner side patterns, and first outer side patterns provided on the outer side of the first inner side patterns. A second coil pattern includes second inner side patterns, and second outer side patterns provided on the outer side of the second inner side patterns. The first and second coil patterns are configured such that the first inner side patterns and the second outer side pattern are connected, and the first outer side patterns and the second inner side patterns are connected. Then, the first and second coil patterns transfer power to the power transmission coil pattern of a power receiving unit in a contactless manner.

2 Claims, 9 Drawing Sheets

POWER TRANSMISSION UNIT

CROSS-REFERENCE TO RELATED APPLICATION(S)

The present application claims priority to and incorporates by reference the entire contents of Japanese Patent Application No. 2018-150242 filed in Japan on Aug. 9, 2018.

BACKGROUND OF THE INVENTION

1. Field of the Invention

The present invention relates to a power transmission unit.

2. Description of the Related Art

In recent years, there is disclosed a power transmission device as a power transmission unit which transfers power in a contactless manner in Japanese Patent Application Laid-open No. 2016-92214. The power transmission device includes a power transmission coil to transfer power, an electric power device which supplies power to the power transmission coil, and a housing which stores the power transmission coil and the electric power device. The power transmission device supplies power to a power reception coil from the power transmission coil by an electromagnetic induction manner in a contactless manner in a state where the power transmission coil is disposed to face the counterpart power reception coil.

By the way, the power transmission device described in Japanese Patent Application Laid-open No. 2016-92214 may cause a power transmission efficiency drop when the power is transferred in a contactless manner for example. With this regard, there is room for further improvement in that point.

SUMMARY OF THE INVENTION

Therefore, the invention has been made in view of the problem, and an object thereof is to provide a power transmission unit which can appropriately transfer power in a contactless manner.

In order to solve the above mentioned problem and achieve the object, a power transmission unit according to one aspect of the present invention includes a substrate, the substrate being configured to include: a first layer that includes a first base material formed in a flat shape and a first coil pattern formed in the first base material in a spiral shape about an axis line; and a second layer that includes a second base material formed in a flat shape and a second coil pattern formed in the second base material in a spiral shape about the axis line, and is stacked in the first layer, wherein the first coil pattern includes a first inner side pattern, and a first outer side pattern provided on an outer side of the first inner side pattern, the second coil pattern includes a second inner side pattern, and a second outer side pattern provided on an outer side of the second inner side pattern, and the first coil pattern and the second coil pattern are configured such that the first inner side pattern and the second outer side pattern are connected, and the first outer side pattern and the second inner side pattern are connected, and transfer power to a counterpart power transmission coil pattern in a contactless manner.

According to another aspect of the present invention, in the power transmission unit, it is preferable that the first coil pattern is configured such that the first inner side pattern and the first outer side pattern each are stacked plural times in each layer of the first base material, the first inner side patterns are connected to each other, and the first outer side patterns are connected to each other, and the second coil pattern is configured such that the second inner side pattern and the second outer side pattern each are stacked plural times in each layer of the second base material, the second inner side patterns are connected to each other, and the second outer side patterns are connected to each other.

According to still another aspect of the present invention, in the power transmission unit, it is preferable that the first coil pattern and the second coil pattern are configured such that an end on a side near the axis line of the first inner side pattern and an end on a side near the axis line of the second outer side pattern are connected, and an end on a side near the axis line of the first outer side pattern and an end on a side near the axis line of the second inner side pattern are connected.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Modes (embodiments) for carrying out the invention will be described with reference to the drawings. The invention is not limited to the content described in the following embodiments. In addition, the components described herein can be easily conceived by a person skilled in the art, and actually the same components are included. Further, the configurations described herein may be approximately combined. In addition, various omissions, replacements, or changes may be performed within a scope not departing from the spirit of the invention.

Embodiments

Figure 1:
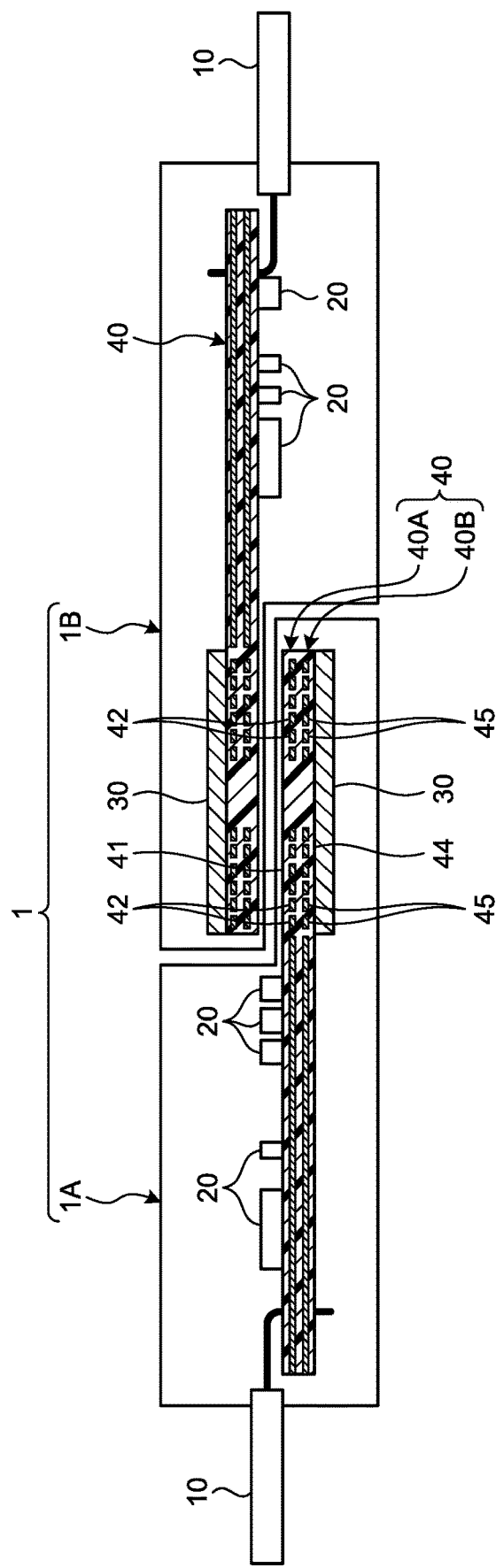
FIG. 1 is a cross-sectional view illustrating an exemplary configuration of a power transmission unit according to an embodiment.
Figure 2:
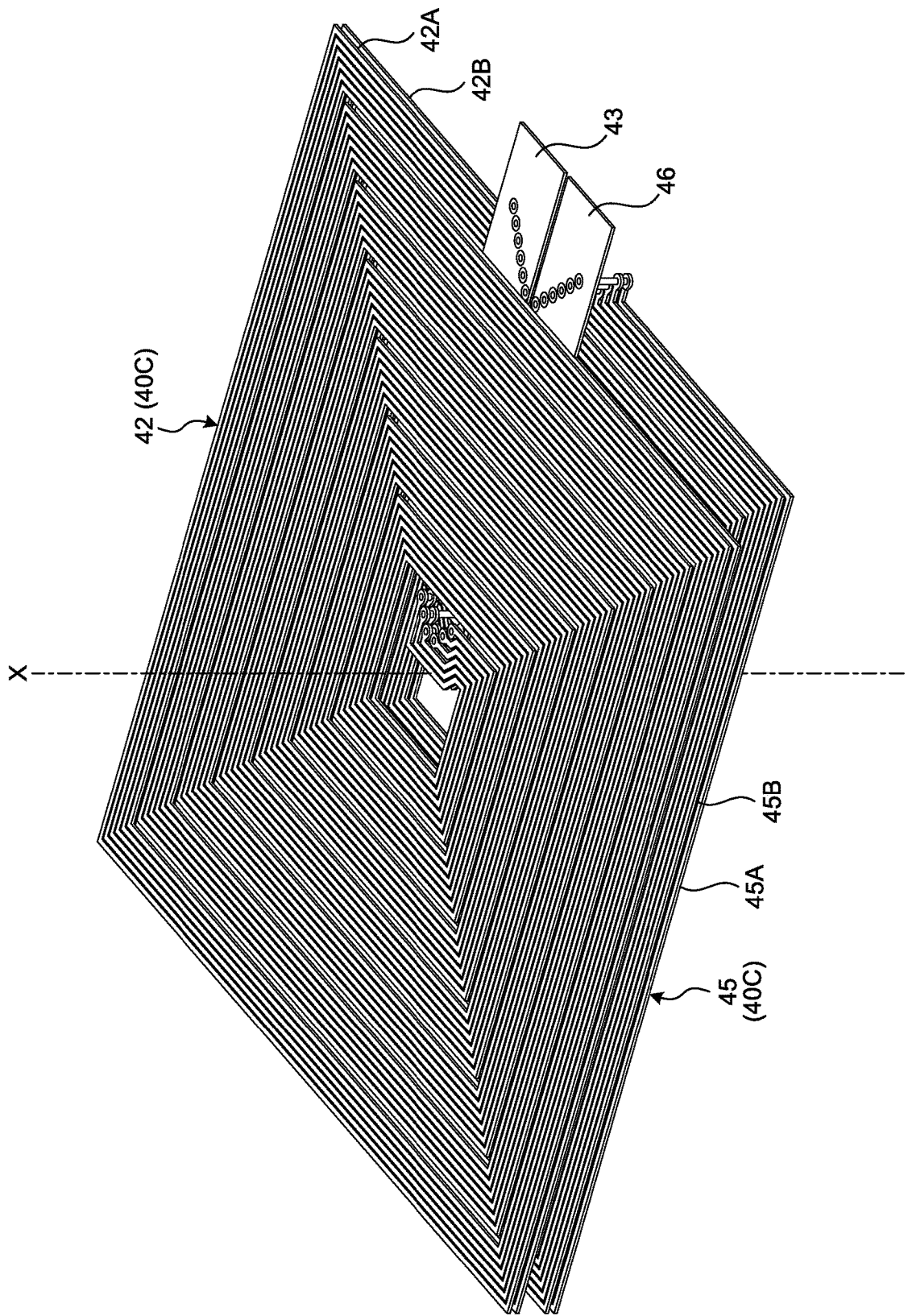
FIG. 2 is a perspective view illustrating an exemplary configuration of a power transmission coil pattern according to an embodiment.
Figure 3:
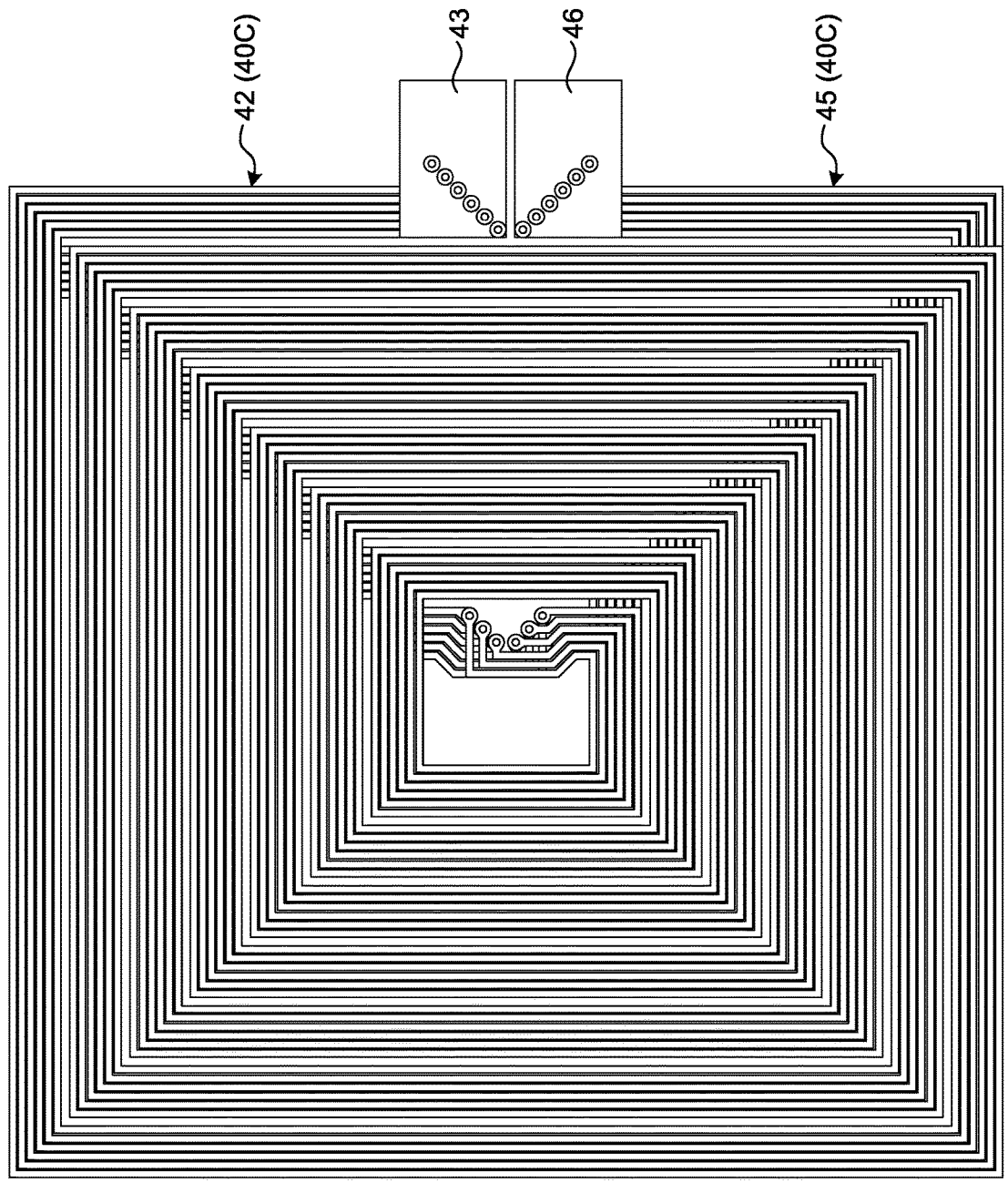
FIG. 3 is a plan view illustrating an exemplary configuration of the power transmission coil pattern according to an embodiment.
Figure 4:
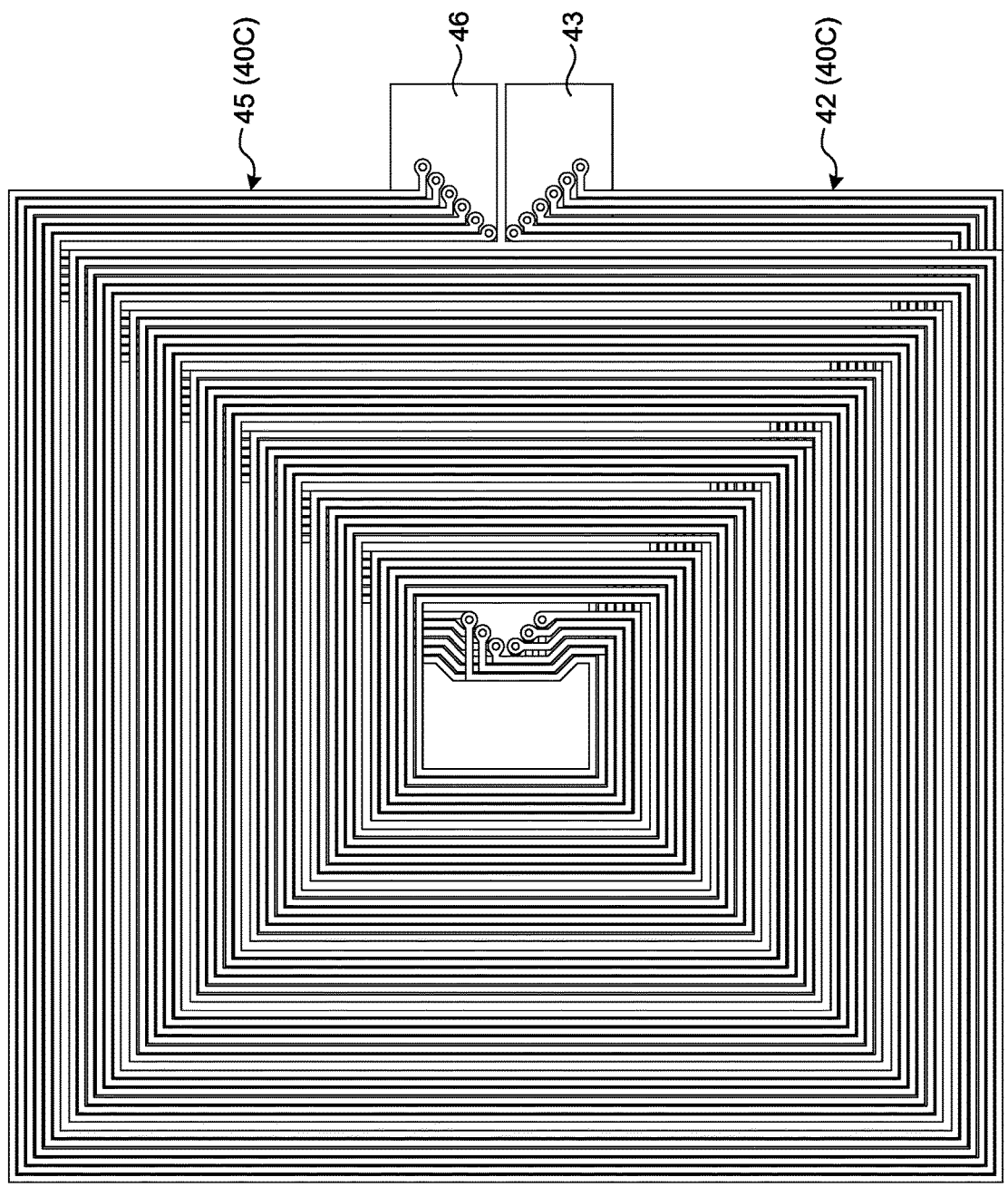
FIG. 4 is a rear view illustrating an exemplary configuration of the power transmission coil pattern according to an embodiment.
Figure 5:
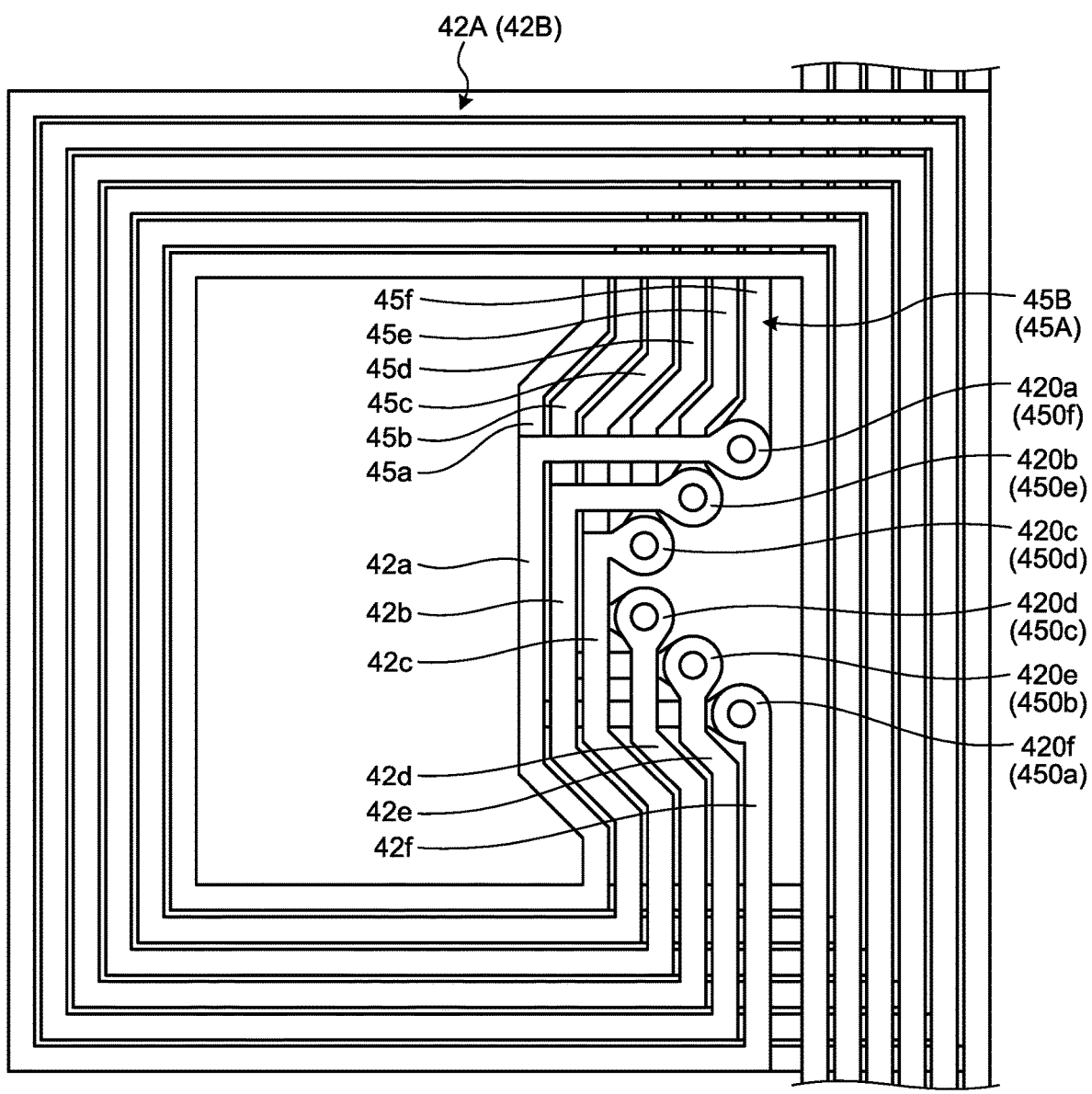
FIG. 5 is a partially enlarged view of FIG. 3.

A power transmission device 1 according to an embodiment will be described with reference to the drawings. FIG. 1 is a cross-sectional view illustrating an exemplary configuration of the power transmission device 1 according to the embodiment. FIG. 2 is a perspective view illustrating an exemplary configuration of a power transmission coil pattern 40C according to the embodiment. FIG. 3 is a plan view illustrating an exemplary configuration of the power transmission coil pattern 40C according to the embodiment. FIG. 4 is a rear view illustrating an exemplary configuration of the power transmission coil pattern 40C according to the embodiment. FIG. 5 is a partially enlarged view of FIG. 3.

The power transmission device 1 according to the embodiment is to transmit power in a contactless manner. The power transmission device 1 includes a power transmitting unit 1A as a power transmission unit and a power receiving unit 1B as a power transmission unit as illustrated in FIG. 1. The power transmitting unit 1A is disposed to face the power receiving unit 1B, and transmits power in a contactless manner. The power receiving unit 1B is disposed to face the power transmitting unit 1A, and receives power in a contactless manner. The power transmitting unit 1A and the power receiving unit 1B have equivalent configurations. Therefore, the following description will be given about the power transmitting unit 1A, and the details of the power receiving unit 1B will be omitted.

The power transmitting unit 1A includes a power line 10, an electronic component 20, a ferrite 30, and a multilayered board 40 as a substrate as illustrated in FIG. 1. The power line 10 is a conductive line through which current flows. One end of the power line 10 is connected to the power supply unit (not illustrated) which supplies power, and the other end is connected to the multilayered board 40. The current supplied from the power supply unit flows in the power line 10 to the multilayered board 40. The electronic component 20 is mounted in a mounting surface of the multilayered board 40, and performs an electrical processing.

The ferrite 30 is a member containing a magnetic material, for example, a complex oxide of iron oxide and metal. The ferrite 30 is formed in a rectangular plate shape for example, and formed in the same size as the power transmission coil pattern 40C (see FIG. 2). The ferrite 30 is disposed to face the power transmission coil pattern 40C in an axial direction along an axis line X of the power transmission coil pattern 40C. The ferrite 30 passes a magnetic flux generated by the power transmission coil pattern 40C to suppress loss in the magnetic flux.

The multilayered board 40 contains various electronic components 20 mounted therein, and forms an electronic circuit which electrically connects the electronic components 20 (so-called printed circuit board). The multilayered board 40 is configured to include a first layer 40A and a second layer 40B, and is multilayered with the first layer 40A and the second layer 40B.

The first layer 40A includes a first base material 41 and a first coil pattern 42. The first base material 41 is configured by an insulating material such as epoxy resin, glass epoxy resin, paper epoxy resin, or ceramic, and is formed in a flat shape (film shape). The first base material 41 is formed with a conductor pattern such as the first coil pattern 42 using a conductive member such as a copper foil.

The first coil pattern 42 is a conductor pattern formed in the first base material 41 using a conductive member such as a copper foil. The first coil pattern 42 is formed in a spiral shape about the axis line X as illustrated in FIGS. 2 and 3, and is formed in a rectangular shape (square shape) when viewed from the axial direction. The first coil pattern 42 is configured by two layers and includes, for example, an upper layer coil pattern 42A and a lower layer coil pattern 42B. The upper layer coil pattern 42A and the lower layer coil pattern 42B each are formed and stacked in the layers of the first base material 41.

The upper layer coil pattern 42A is formed such that six coil patterns are formed in a spiral shape about the axis line X. The upper layer coil pattern 42A is formed with, for example, first to sixth patterns 42a to 42f as six coil patterns as illustrated in FIG. 5. The first pattern 42a is a pattern located on the innermost side. The second pattern 42b is a pattern located on the second inner side. The third pattern 42c is a pattern located on the third inner side. The fourth pattern 42d is a pattern located on the fourth inner side (that is, the third outer side). The fifth pattern 42e is a pattern located on the second outer side. The sixth pattern 42f is a pattern located on the outermost side. With six coil patterns, the upper layer coil pattern 42A is formed such that the first to third patterns 42a to 42c are relatively located on the inner side, and the fourth to sixth patterns 42d to 42f are relatively located on the outer side. In other words, the first to third patterns 42a to 42c correspond to a first inner side pattern, and the fourth to sixth patterns 42d to 42f correspond to a first outer side pattern.

The lower layer coil pattern 42B is configured similarly to the upper layer coil pattern 42A, and connected to the upper layer coil pattern 42A. Specifically, the lower layer coil pattern 42B is formed such that six coil patterns are formed in a spiral shape about the axis line X. The lower layer coil pattern 42B is formed with the first to sixth patterns 42a to 42f as six coil patterns as illustrated in FIGS. 2 and 5 similarly to the upper layer coil pattern 42A. With six coil patterns, the lower layer coil pattern 42B is formed such that the first to third patterns 42a to 42c are relatively located on the inner side, and the fourth to sixth patterns 42d to 42f are relatively located on the outer side.

The first coil pattern 42 is formed such that the first to sixth patterns 42a to 42f of the upper layer coil pattern 42A and the first to sixth patterns 42a to 42f of the lower layer coil pattern 42B each are stacked in the layers of the first base material 41. Then, the first coil pattern 42 connects the first to sixth patterns 42a to 42f of the upper layer coil pattern 42A and the first to sixth patterns 42a to 42f of the lower layer coil pattern 42B respectively. Specifically, the first coil pattern 42 connects the first pattern 42a of the upper layer coil pattern 42A and the first pattern 42a of the lower layer coil pattern 42B, the second pattern 42b of the upper layer coil pattern 42A and the second pattern 42b of the lower layer coil pattern 42B, and the third pattern 42c of the upper layer coil pattern 42A and the third pattern 42c of the lower layer coil pattern 42B. In addition, the first coil pattern 42 connects the fourth pattern 42d of the upper layer coil pattern 42A and the fourth pattern 42d of the lower layer coil pattern 42B, the fifth pattern 42e of the upper layer coil pattern 42A and the fifth pattern 42e of the lower layer coil pattern 42B, and the sixth pattern 42f of the upper layer coil pattern 42A and the sixth pattern 42f of the lower layer coil pattern 42B.

Next, the second layer 40B will be described. The second layer 40B is configured equivalently to the first layer 40A. Specifically, the second layer 40B includes a second base material 44 and a second coil pattern 45. The second base material 44 is configured by an insulating material such as epoxy resin, glass epoxy resin, paper epoxy resin, or ceramic, and is formed in a flat shape (film shape). The second base material 44 is formed with a conductor pattern such as the second coil pattern 45 using a conductive member such as a copper foil.

The second coil pattern 45 is a conductor pattern formed in the second base material 44 using a conductive member such as a copper foil. The second coil pattern 45 is formed in a spiral shape about the axis line X as illustrated in FIGS. 2 and 4, and is formed in a rectangular shape (square shape) when viewed from the axial direction. The second coil pattern 45 is configured by two layers and includes, for example, an upper layer coil pattern 45A and a lower layer coil pattern 45B. The upper layer coil pattern 45A and the lower layer coil pattern 45B each are formed and stacked in the layers of the second base material 44.

The upper layer coil pattern 45A is formed such that six coil patterns are formed in a spiral shape about the axis line X. The upper layer coil pattern 45A is formed with, for example, a first pattern 45a to the sixth pattern 45f as six coil patterns as illustrated in FIG. 5. The first pattern 45a is a pattern located on the innermost side. The second pattern 45b is a pattern located on the second inner side. The third pattern 45c is a pattern located on the third inner side. The fourth pattern 45d is a pattern located on the fourth inner side (that is, the third outer side). The fifth pattern 45e is a pattern located on the second outer side. The sixth pattern 45f is a pattern located on the outermost side. With six coil patterns, the upper layer coil pattern 45A is formed such that the first to third patterns 45a to 45c are relatively located on the inner side, and the fourth to sixth patterns 45d to 45f are relatively located on the outer side. In other words, the first to third patterns 45a to 45c correspond to a second inner side pattern, and the fourth to sixth patterns 45d to 45f correspond to a second outer side pattern.

The lower layer coil pattern 45B is configured similarly to the upper layer coil pattern 45A, and connected to the upper layer coil pattern 45A. Specifically, the lower layer coil pattern 45B is formed such that six coil patterns are formed in a spiral shape about the axis line X. The lower layer coil pattern 45B is formed with the first to sixth patterns 45a to 45f as six coil patterns as illustrated in FIGS. 2 and 5 similarly to the upper layer coil pattern 45A. With six coil patterns, the lower layer coil pattern 45B is formed such that the first to third patterns 45a to 45c are relatively located on the inner side, and the fourth to sixth patterns 45d to 45f are relatively located on the outer side.

The second coil pattern 45 is formed such that the first to sixth patterns 45a to 45f of the upper layer coil pattern 45A and the first to sixth patterns 45a to 45f of the lower layer coil pattern 45B each are stacked in the layers of the second base material 44. Then, the second coil pattern 45 connects the first to sixth patterns 45a to 45f of the upper layer coil pattern 45A and the first to sixth patterns 45a to 45f of the lower layer coil pattern 45B respectively. Specifically, the second coil pattern 45 connects the first pattern 45a of the upper layer coil pattern 45A and the first pattern 45a of the lower layer coil pattern 45B, the second pattern 45b of the upper layer coil pattern 45A and the second pattern 45b of the lower layer coil pattern 45B, and the third pattern 45c of the upper layer coil pattern 45A and the third pattern 45c of the lower layer coil pattern 45B. In addition, the first coil pattern 42 connects the fourth pattern 45d of the upper layer coil pattern 45A and the fourth pattern 45d of the lower layer coil pattern 45B, the fifth pattern 45e of the upper layer coil pattern 45A and the fifth pattern 45e of the lower layer coil pattern 45B, and the sixth pattern 45f of the upper layer coil pattern 45A and the sixth pattern 45f of the lower layer coil pattern 45B.

Then, the first and second coil patterns 42 and 45 are connected such that the first to third patterns 42a to 42c on the inner side of the first coil pattern 42 are connected to the fourth to sixth patterns 45d to 45f on the outer side of the second coil pattern 45. The first and second coil patterns 42 and 45 are connected such that, for example, ends 420a to 420c on a side near the axis line X of the first to third patterns 42a to 42c are connected to ends 450d to 450f on a side near the axis line X of the fourth to sixth patterns 45d to 45f.

In addition, the first and second coil patterns 42 and 45 are connected such that the fourth to sixth patterns 42d to 42f on the outer side of the first coil pattern 42 are connected to the first to third patterns 45a to 45c on the inner side of the second coil pattern 45. The first and second coil patterns 42 and 45 are connected such that, for example, ends 420d to 420f on a side near the axis line X of the fourth to sixth patterns 42d to 42f are connected to ends 450a to 450c on a side near the axis line X of the first to third patterns 45a to 45c.

Specifically, the first and second coil patterns 42 and 45 are connected such that the end 420a of the first pattern 42a on the innermost side of the first coil pattern 42 is connected to the end 450f of the sixth pattern 45f on the outermost side of the second coil pattern 45, the end 420b of the second pattern 42b on the second inner side of the first coil pattern 42 is connected to the end 450e of the fifth pattern 45e on the second outer side of the second coil pattern 45, and the end 420c of the third pattern 42c on the third inner side of the first coil pattern 42 is connected to the end 450d of the fourth pattern 45d on the third outer side of the second coil pattern 45.

In addition, the first and second coil patterns 42 and 45 are connected such that the end 420f of the sixth pattern 42f on the outermost side of the first coil pattern 42 is connected to the end 450a of the first pattern 45a on the innermost side of the second coil pattern 45, the end 420e of the fifth pattern 42e on the second outer side of the first coil pattern 42 is connected to the end 450b of the second pattern 45b on the second inner side of the second coil pattern 45, and the end 420d of the fourth pattern 42d on the third outer side of the first coil pattern 42 is connected to the end 450c of the third pattern 45c on the third inner side of the second coil pattern 45. In addition, the end of the first coil pattern 42 on the opposite side to the axis line X is connected to a terminal 43. The end of the second coil pattern 45 on the opposite side to the axis line X is connected to a terminal 46. Then, the first and second coil patterns 42 and 45 are supplied with power through the terminals 43 and 46, and transfer power in a contactless manner with respect to a power transmission coil pattern of the power receiving unit 1B.

Figure 6:
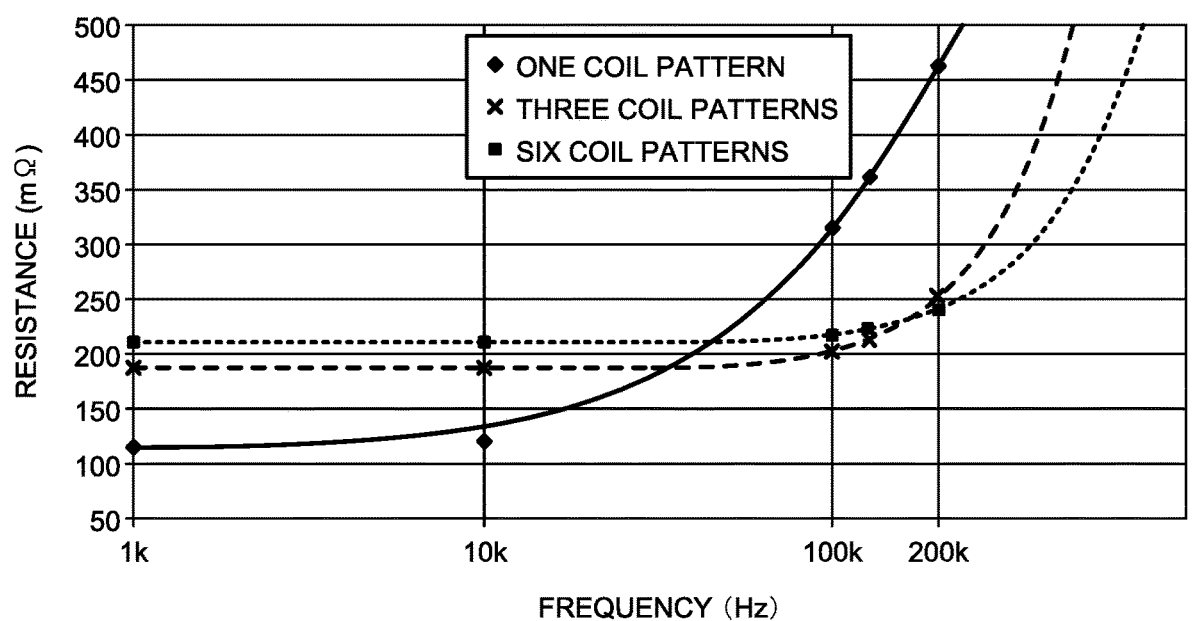
FIG. 6 is a diagram illustrating a high-frequency resistance (skin effect) of the power transmission coil pattern according to an embodiment.

Next, a high-frequency resistance (skin effect) of the power transmission coil pattern 40C will be described. FIG. 6 is a diagram illustrating the high-frequency resistance (skin effect) of the power transmission coil pattern 40C according to the embodiment. In FIG. 6, the vertical axis represents resistance (mΩ), and the horizontal axis represents frequency (Hz). FIG. 6 illustrates the high-frequency resistances in a case where the power transmission coil pattern 40C is divided into one coil pattern, three coil patterns, and six coil patterns. Further, in FIG. 6, results in a case where the number of coil patterns are changed are plotted, in which the connection of the coil patterns is similar to the related art and the outer side and the inner side are not connected.

In the power transmission coil pattern 40C, the resistance of three coil patterns is lowest at around a frequency of 100 kHz as illustrated in FIG. 6. In addition, in the power transmission coil pattern 40C, the resistance of six coil patterns is lowest at a frequency exceeding 200 kHz. With this configuration, in the power transmission coil pattern 40C, it can be seen that three coil patterns are desirably applied at around a frequency of 100 kHz, and six coil patterns are desirably applied in a case where the frequency exceeds 200 kHz.

Figure 7A:
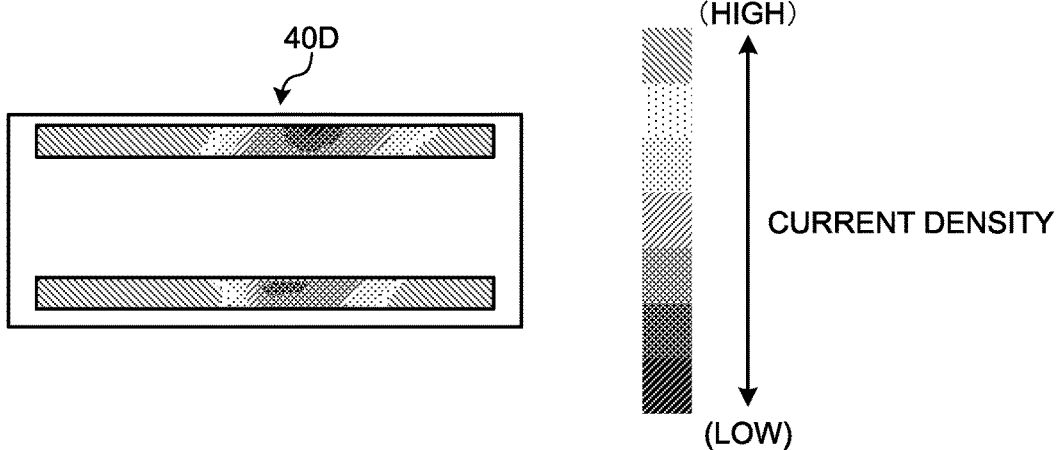
FIG. 7A is a diagram illustrating a current density distribution of the power transmission coil pattern (one coil pattern) according to a comparative example.
Figure 7B:
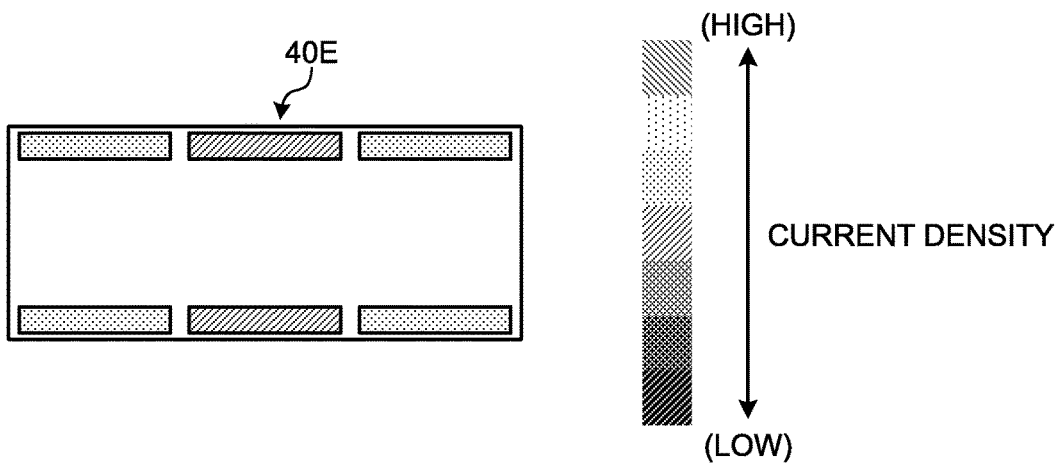
FIG. 7B is a diagram illustrating the current density distribution of the power transmission coil pattern (three coil patterns) according to an embodiment.
Figure 7C:
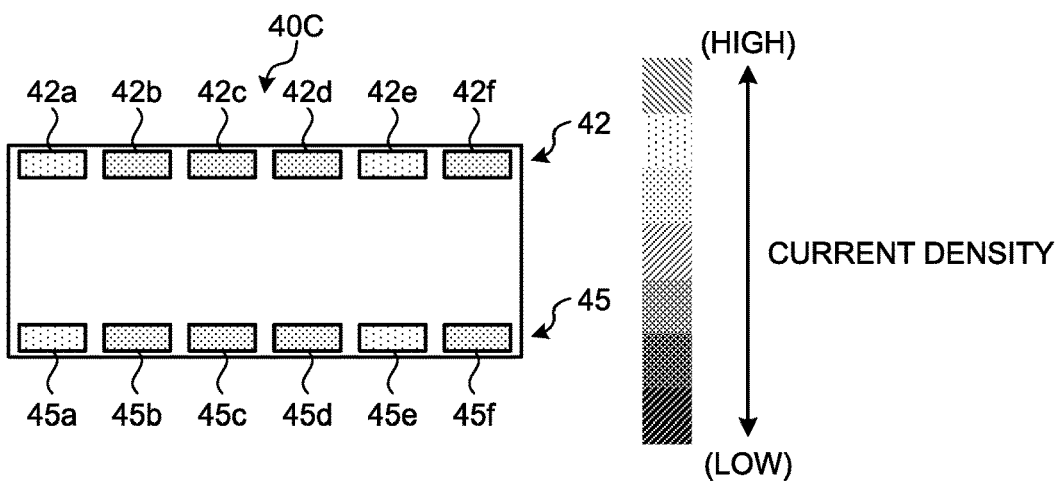
FIG. 7C is a diagram illustrating the current density distribution of the power transmission coil pattern (six coil patterns) according to an embodiment.

FIG. 7A is a diagram illustrating a current density distribution of a power transmission coil pattern 40D (one coil pattern) according to a comparative example. FIG. 7B is a diagram illustrating the current density distribution of a power transmission coil pattern 40E (three coil patterns) according to the embodiment. FIG. 7C is a diagram illustrating the current density distribution of the power transmission coil pattern 40C (six coil patterns) according to the embodiment. FIGS. 7A to 7C illustrate the current density distribution at a frequency of 125 kHz. As illustrated in FIG. 7A, the current flowing to the power transmission coil pattern 40D (one coil pattern) is concentrated on both sides of the coil pattern, and hardly flows to the center portion of the coil pattern. With this configuration, in the power transmission coil pattern 40D, the effective conductor area where the current flows becomes relatively small, and the high-frequency resistance becomes relatively large. On the other hand, as illustrated in FIGS. 7B and 7C, the current flowing to the power transmission coil pattern 40E (three coil patterns) and the power transmission coil pattern 40C (six coil patterns) is not concentrated on one part of the coil pattern but flows evenly. With this configuration, the power transmission coil patterns 40E and 40C can keep the effective conductor area where the current flows. It is possible to suppress that the high-frequency resistance becomes large. As a result, the power transmission coil patterns 40E and 40C can suppress the skin effect.

Figure 8:
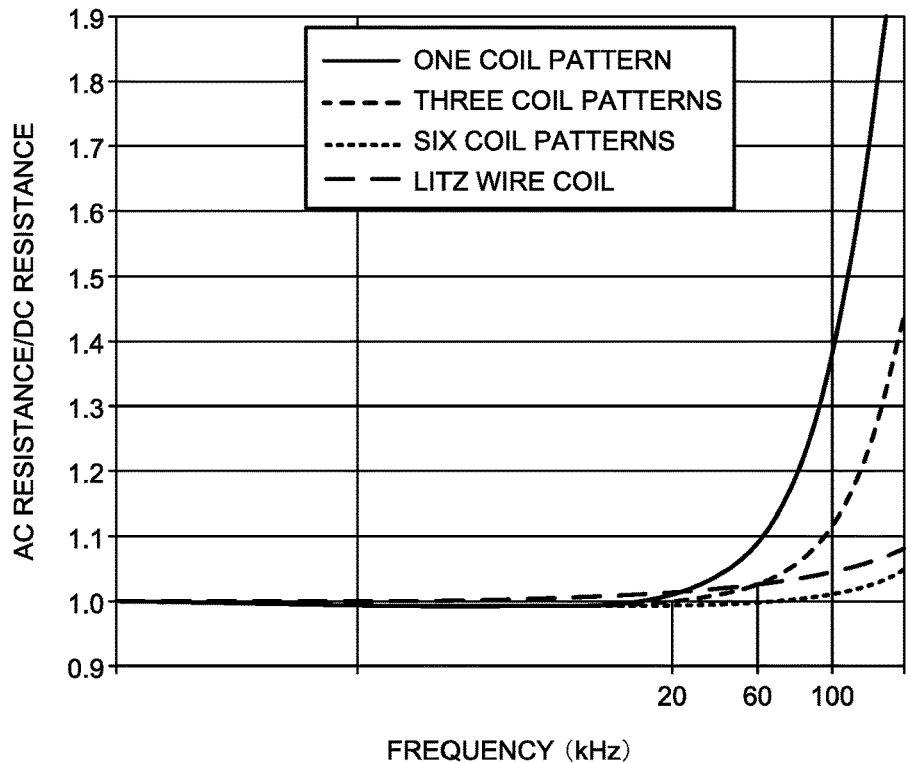
FIG. 8 is a diagram illustrating an increasing rate of the high-frequency resistance of the power transmission coil pattern according to an embodiment.

FIG. 8 is a diagram illustrating an increasing rate of the high-frequency resistance of the power transmission coil pattern 40C according to the embodiment. In FIG. 8, the vertical axis represents a rate (AC resistance/DC resistance) of an AC resistance to a DC resistance, and the horizontal axis represents frequency (Hz). FIG. 8 illustrates the AC resistance/DC resistance in a case where the power transmission coil pattern 40C is one coil pattern, three coil patterns, six coil patterns, and a litz wire coil.

In the power transmission coil pattern 40C, the AC resistances of one coil pattern and three coil patterns are increased when the frequency exceeds 20 kHz. In the power transmission coil pattern 40C, the resistance of three coil patterns becomes larger than the litz wire coil when the frequency exceeds 60 kHz. In the power transmission coil pattern 40C, the resistance of six coil patterns becomes larger than the resistance of the litz wire coil when the frequency exceeds 200 kHz even though the resistance of six coil patterns is lowest. With this configuration, it can be seen that, in the power transmission coil pattern 40C, six coil patterns can suppress the skin effect at frequencies of 20 kHz to 200 kHz.

Figure 9:
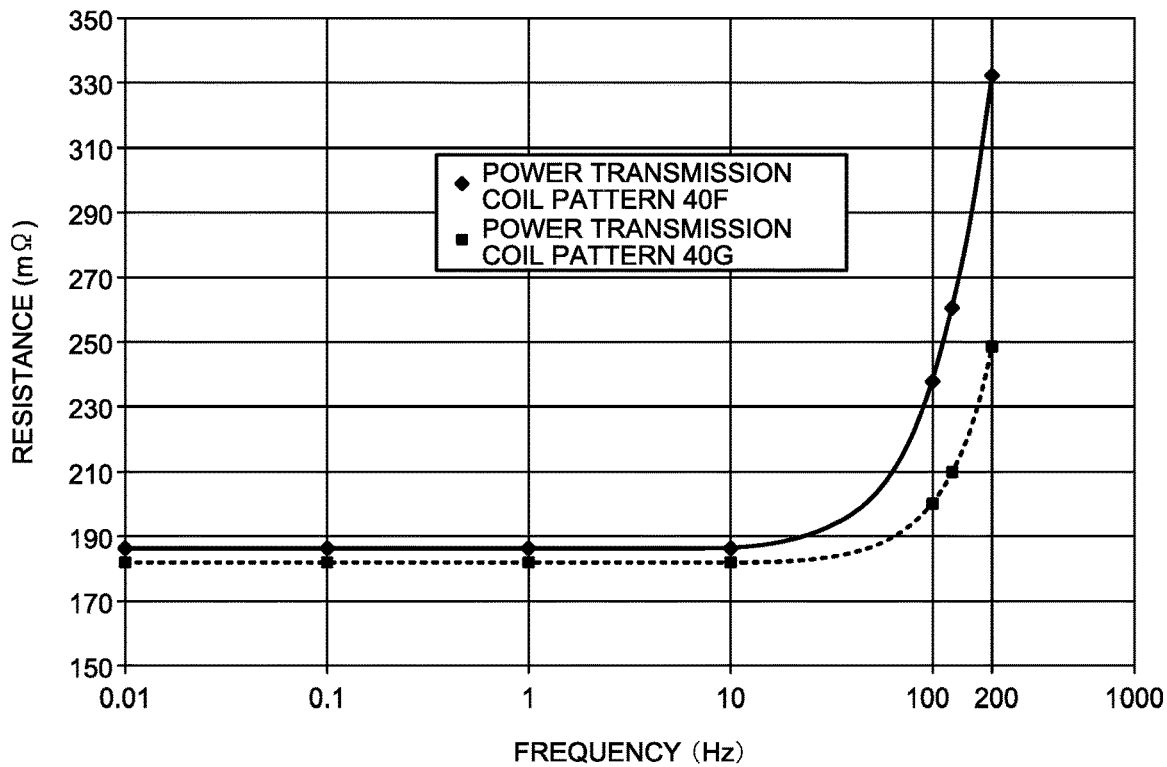
FIG. 9 is a diagram illustrating the high-frequency resistance (proximity effect) of the power transmission coil pattern according to an embodiment.

Next, the high-frequency resistance (proximity effect) of the power transmission coil pattern 40C will be described. FIG. 9 is a diagram illustrating the high-frequency resistance (proximity effect) of the power transmission coil pattern 40C according to the embodiment. In FIG. 9, the vertical axis represents resistance (mΩ), and the horizontal axis represents frequency (kHz). FIG. 9 illustrates the high-frequency resistance in power transmission coil patterns 40F and 40G illustrated in FIGS. 10A and 10B in a case where the pattern is divided into three coil patterns. The power transmission coil pattern 40F is a coil pattern in which the inner coil patterns 47a and the outer coil patterns 47c are connected. The power transmission coil pattern 40G is a coil pattern which connects the inner coil pattern 47a and the outer coil pattern 47c. Further, the power transmission coil patterns 40F and 40G connect the center coil patterns 47b.

It can be seen that the power transmission coil pattern 40G has a high-frequency resistance smaller than the power transmission coil pattern 40F as illustrated in FIG. 9. It can be seen that the power transmission coil pattern 40G has a high-frequency resistance smaller than the power transmission coil pattern 40F by about 52 mΩ, for example, in a case where the frequency is 100 kHz. In addition, it can be seen that the power transmission coil pattern 40G has a high-frequency resistance smaller than the power transmission coil pattern 40F by about 85 mΩ in a case where the frequency is 200 kHz.

Figure 10A:
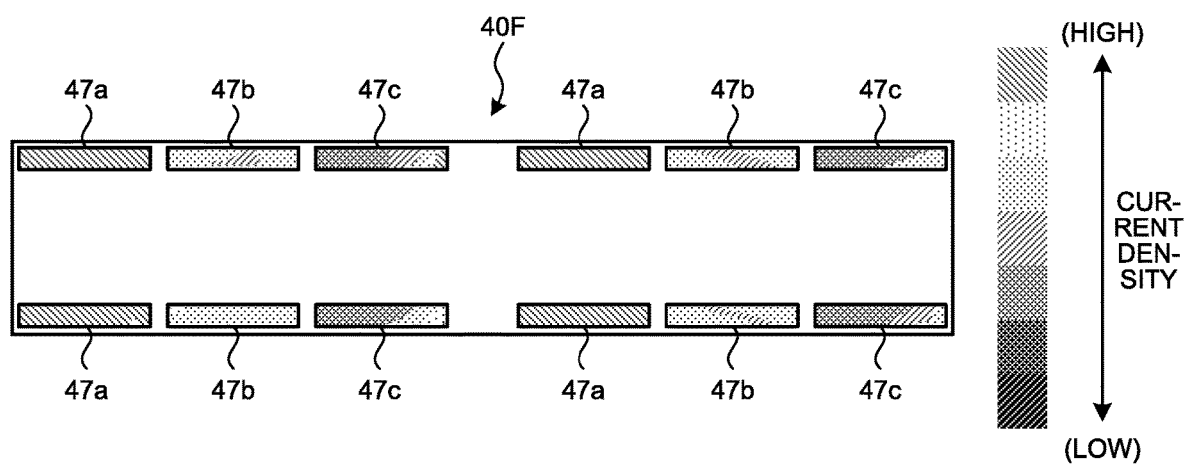
FIG. 10A is a diagram illustrating the current density distribution of the power transmission coil pattern according to a comparative example.
Figure 10B:
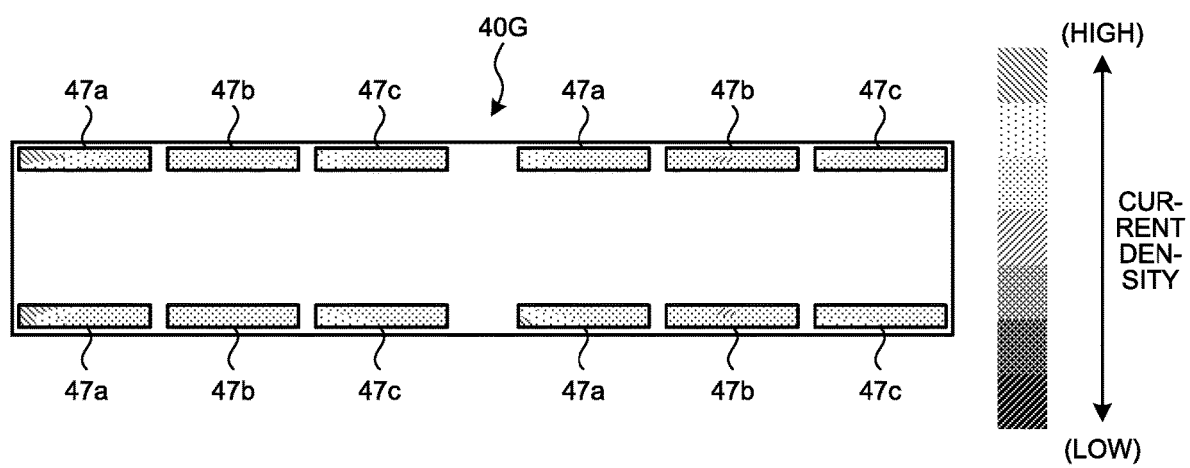
FIG. 10B is a diagram illustrating the current density distribution of the power transmission coil pattern according to an embodiment.

FIG. 10A is a diagram illustrating the current density distribution of the power transmission coil pattern 40F according to a comparative example. FIG. 10B is a diagram illustrating the current density distribution of the power transmission coil pattern 40G according to the embodiment. As illustrated in FIG. 10A, the current flowing to the power transmission coil pattern 40F is concentrated on the inner coil pattern 47a, and hardly flows to the outer coil pattern 47c. With this configuration, in the power transmission coil pattern 40F, the effective conductor area where the current flows becomes relatively small, and the high-frequency resistance becomes relatively large. On the other hand, as illustrated in FIG. 10B, the current flowing to the power transmission coil pattern 40G is not concentrated on the inner coil pattern 47a, but flows evenly. With this configuration, the power transmission coil pattern 40G can keep the effective conductor area where the current flows, and can suppress that the high-frequency resistance becomes large. As a result, the power transmission coil pattern 40G can suppress the proximity effect.

As described above, the power transmitting unit 1A according to the embodiment includes the multilayered board 40. The multilayered board 40 is configured to include the first layer 40A and the second layer 40B. The first layer 40A includes the first base material 41 formed in a flat shape and the first coil pattern 42 formed in the first base material 41 in a spiral shape about the axis line X. The second layer 40B includes the second base material 44 formed in a flat shape and the second coil pattern 45 formed in the second base material 44 in a spiral shape about the axis line X, and is stacked in the first layer 40A. The first coil pattern 42 includes the first to third patterns 42a to 42c, and the fourth to sixth patterns 42d to 42f which are provided on the outer side of the first to third patterns 42a to 42c. The second coil pattern 45 includes the first to third patterns 45a to 45c, and the fourth to sixth patterns 45d to 45f which are provided on the outer side of the first to third patterns 45a to 45c. In the first and second coil patterns 42 and 45, the first to third patterns 42a to 42c on a first inner side and the fourth to sixth patterns 45d to 45f on a second inner side are connected. Further, the fourth to sixth patterns 42d to 42f on a first outer side and the first to third patterns 45a to 45c on a second inner side are connected. Then, the first and second coil patterns 42 and 45 transfer power to the power transmission coil pattern of the power receiving unit 1B in a contactless manner.

With the configuration, the power transmitting unit 1A is configured such that the first coil pattern 42 and the second coil pattern 45 each include a plurality of patterns, so that the skin effect can be suppressed. In addition, the power transmitting unit 1A may be configured such that the first coil pattern 42 and the second coil pattern 45 are connected to increase the number of windings. The power transmitting unit 1A can reduce an influence of the magnetic flux by connecting the inner side and the outer side of the patterns, and the proximity effect can be suppressed. With the configuration, the power transmitting unit 1A can suppress the high-frequency resistance, and a heating loss can be suppressed. As a result, the power transmitting unit 1A can improve a power transmission efficiency, and can appropriately transfer power in a contactless manner.

In addition, in the power transmitting unit 1A, a strand manufacturing, an enamel coating process, a twisting process, a coil winding process, a termination process, and a coil bonding process can be reduced compared to a coil formed with the litz wire. Therefore, it is possible to simplify a manufacturing process. In the case of the coil formed with the litz wire of the related art, a substrate for mounting the electronic component 20 and a substrate for mounting a coil are prepared separately, and there is a need to connect these substrates. With this regard, in the power transmitting unit 1A, the electronic component 20 and the power transmission coil pattern 40C can be formed in the same multilayered board 40. It is possible to reduce the process of connecting the multilayered board 40. With the configuration, the power transmitting unit 1A can suppress a manufacturing cost and an inspection cost.

In the power transmitting unit 1A, the first coil pattern 42 is formed such that the first to third patterns 42a to 42c and the fourth to sixth patterns 42d to 42f each are stacked plural times in each layer of the first base material 41, the first to third patterns 42a to 42c are connected, and the fourth to sixth patterns 42d to 42f are connected. The second coil pattern 45 is formed such that the first to third patterns 45a to 45c and the fourth to sixth patterns 45d to 45f each are stacked plural times in each layer of the second base material 44, the first to third patterns 45a to 45c are connected, and the fourth to sixth patterns 45d to 45f are connected. With the configuration, the power transmitting unit 1A can increase a cross-sectional area of the power transmission coil pattern 40C, and can increase the amount of transmitting power.

In the power transmitting unit 1A, the first and second coil patterns 42 and 45 are formed such that the ends 420a to 420c on a side near the axis line X of the first to third patterns 42a to 42c on the first inner side are connected to the ends 450d to 450f on a side near the axis line X of the fourth to sixth patterns 45d to 45f on the second outer side. In addition, the first and second coil patterns 42 and 45 are formed such that the ends 420d to 420f on a side near the axis line X of the fourth to sixth patterns 42d to 42f on the first outer side are connected to the ends 450a to 450c on a side near the axis line X of the first to third patterns 45a to 45c on the second inner side. With the configuration, the power transmitting unit 1A can be configured such that the first coil pattern 42 and the second coil pattern 45 on a side near the axis line X of the power transmission coil pattern 40C are connected.

Further, the above description has been described about an example where the first and second coil patterns 42 and 45 are formed in a rectangular shape (square shape) when viewed from the axial direction, but the invention is not limited thereto. For example, it is possible to form the patterns in a circular shape when viewed from the axial direction.

In addition, the first coil pattern 42 has been described to have two-layered configuration of the upper layer coil pattern 42A and the lower layer coil pattern 42B, but the invention is not limited thereto. One-layered configuration or three-or-more-layered configurations may be employed. Similarly, the second coil pattern 45 has been described to have two-layered configuration of the upper layer coil pattern 45A and the lower layer coil pattern 45B, but the invention is not limited thereto. One-layered configuration or three-or-more-layered configuration may be employed.

In the power transmission unit according to the embodiment, the first and second coil patterns are configured such that the first inner side pattern and the second outer side pattern are connected, and the first outer side pattern and the second inner side pattern are connected. Therefore, a proximity effect can be suppressed, and the power can be appropriately transferred in a contactless manner.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A power transmission unit, comprising:
a substrate, the substrate being configured to include:
a first layer that includes a first base material formed in a flat shape and a first coil pattern formed in the first base material in a spiral shape about an axis line; and
a second layer that includes a second base material formed in a flat shape and a second coil pattern formed in the second base material in a spiral shape about the axis line, and is stacked on the first layer, wherein
the first layer and the second layer are parallel to each other and the axis line is perpendicular to the first and the second layer,
the first coil pattern includes a first inner side pattern, and a first outer side pattern provided on an outer side of the first inner side pattern, separate from said first inner side pattern,
the second coil pattern includes a second inner side pattern, and a second outer side pattern provided on an outer side of the second inner side pattern, separate from said second inner side pattern,
the first coil pattern and the second coil pattern are configured such that the first inner side pattern and the second outer side pattern are connected, and the first outer side pattern and the second inner side pattern are connected, and transfer power to a counterpart power transmission coil pattern in a contactless manner, the first base material and the second base material each include an upper and a lower layer, respectively, the first coil pattern is configured such that the first inner side pattern and the first outer side pattern each are stacked in each layer of the first base material, the first base material including a first upper layer coil pattern and a first lower layer coil pattern, the first inner side patterns in the each layer of the first base material are connected to each other, and the first outer side patterns in the each layer of the first base material are connected to each other, and the second coil pattern is configured such that the second inner side pattern and the second outer side pattern each are stacked in each layer of the second base material, the second base material including a second upper layer coil pattern and a second lower layer coil pattern, the second inner side patterns in the each layer of the second base material are connected to each other, and the second outer side patterns in the each layer of the second base material are connected to each other.

2. The power transmission unit according to claim 1, wherein the first coil pattern and the second coil pattern are configured such that an end on a side near the axis line of the first inner side pattern and an end on a side near the axis line of the second outer side pattern are connected, and an end on a side near the axis line of the first outer side pattern and an end on a side near the axis line of the second inner side pattern are connected.

\* \* \* \* \*